United States Patent [19]

Afrance et al.

[11] 3,861,963
[45] Jan. 21, 1975

[54] BATTERY SEPARATOR CONSTRUCTION

[75] Inventors: Frank C. Afrance, Costa Mesa;
Albert G. Rosa, Placentia; Ronald J. Haas, Orange, all of Calif.

[73] Assignee: McDonnell Douglas Corporation, Santa Monica, Calif.

[22] Filed: June 17, 1971

[21] Appl. No.: 154,218

Related U.S. Application Data

[63] Continuation of Ser. No. 707,808, Feb. 23, 1968, abandoned.

[52] U.S. Cl. ............................... 136/146, 136/147
[51] Int. Cl. ........................................... H01m 3/02
[58] Field of Search ........... 136/145, 146, 147, 148, 136/6, 30

[56] References Cited
UNITED STATES PATENTS

| | | | |
|---|---|---|---|
| 1,128,232 | 2/1915 | Davis | 136/147 |
| 1,942,668 | 1/1934 | Smith | 136/145 |
| 2,653,985 | 9/1953 | Philipps | 136/145 |
| 2,851,512 | 9/1958 | Andre | 136/147 |
| 3,238,056 | 3/1966 | Pall et al. | 117/140 X |
| 3,246,767 | 4/1966 | Pall et al. | 117/140 X |
| 3,364,077 | 1/1968 | Arrance et al. | 136/146 |
| 3,542,596 | 11/1970 | Arrance | 136/148 |

FOREIGN PATENTS OR APPLICATIONS

| | | | |
|---|---|---|---|
| 412,625 | 7/1934 | Great Britain | 136/145 |

*Primary Examiner*—Donald L. Walton
*Attorney, Agent, or Firm*—Max Geldin

[57] ABSTRACT

Production of a separator, preferably in the form of a compartment, for insertion therein of a battery electrode, preferably by dip-coating a flexible porous substrate, e.g., potassium titanate paper or nylon, in a mixture preferably of a major portion of an inorganic or ceramic separator material, a minor portion of potassium titanate in short fiber form, and a minor portion of an organic polymer, e.g., polyphenylene oxide, dissolved in a suitable solvent such as chloroform. The flexible porous substrate is placed in the mixture, preferably maintained under vibration, and stirred; the substrate and applied coating are removed from the mixture, and the coating is dried to remove solvent and is cured at elevated temperature. The resulting porous separator, coated, filled or impregnated with the above mixture, has low resistivity, is smooth and uniform in thickness, and is flexible, and has high resistance to alkali and to elevated temperatures. Preferably the flexible porous substrate is first formed into a box or bag and then treated with the above mixture to form a separator. An electrode, such as a zinc electrode, is inserted in the bag either before or after coating and impregnation. Alternatively, a film or sheet of the substrate is treated with the above mixture to form a flexible separator, and the resulting flexible separator is then formed into a box-like configuration for receiving an electrode, or is wrapped around an electrode or electrodes.

11 Claims, 6 Drawing Figures

PATENTED JAN 21 1975
3,861,963
SHEET 1 OF 2
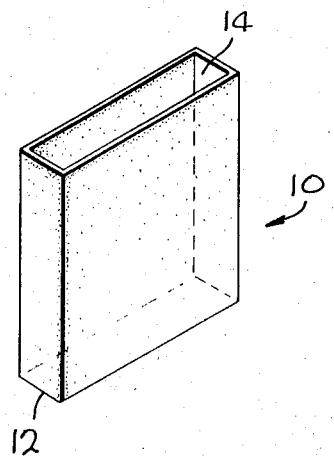
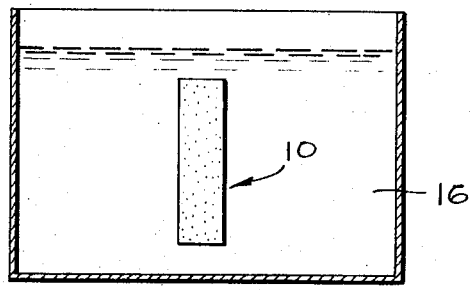
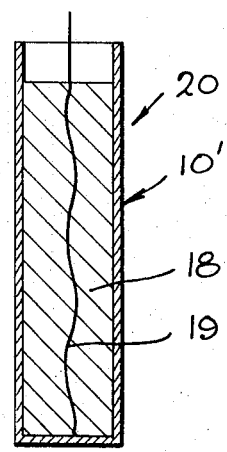
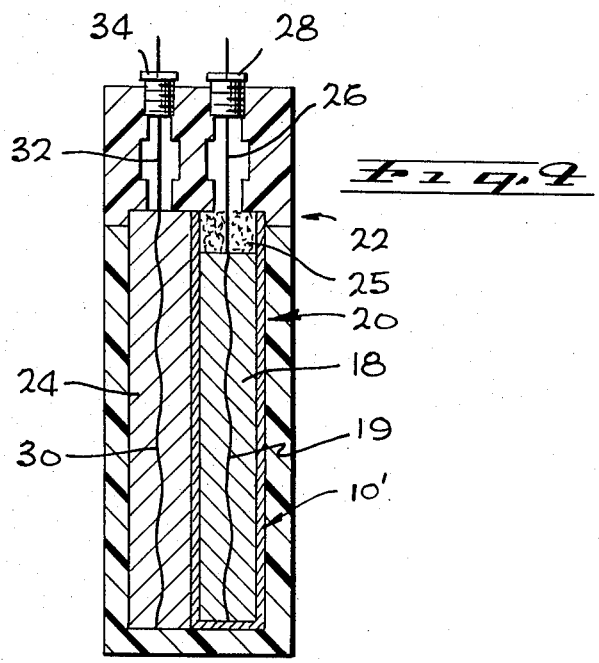
FRANK C. ARRANCE
ALBERT G. ROSA
RONALD J. HAAS
INVENTORS
BY Max Geldin
ATTORNEY

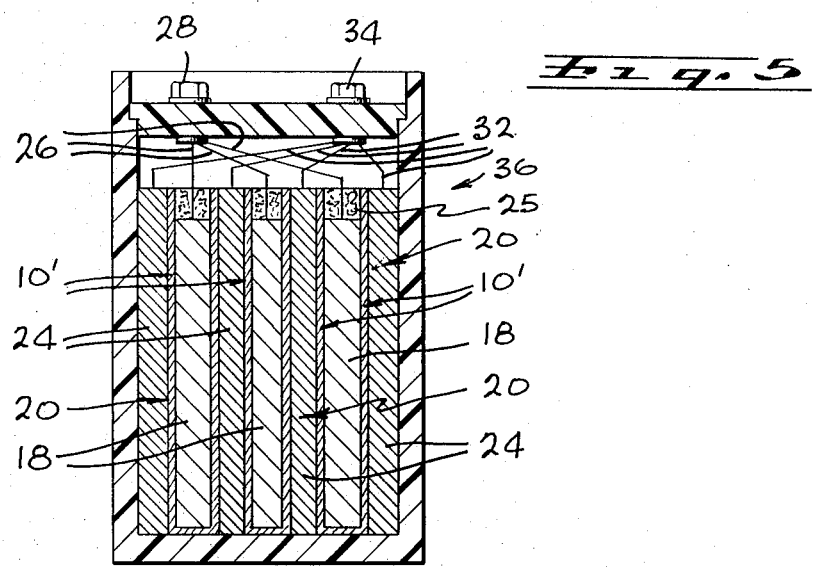
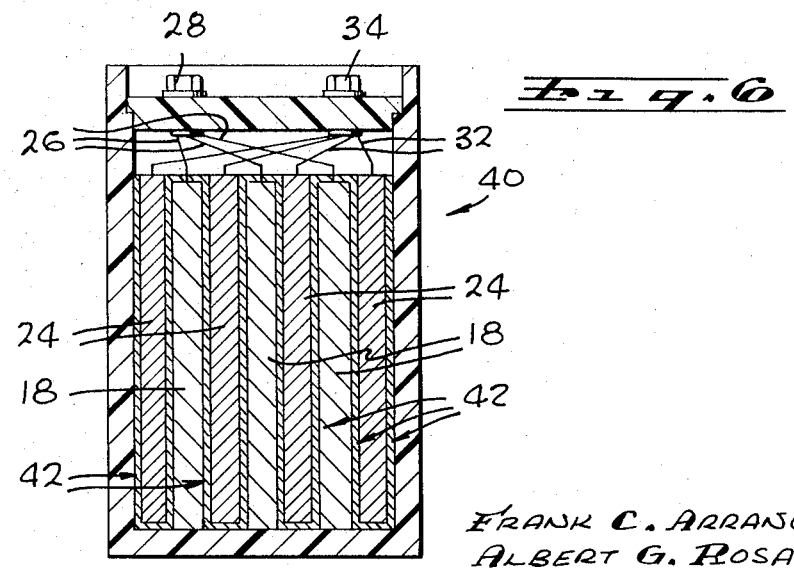

BATTERY SEPARATOR CONSTRUCTION

This is a continuation of application Ser. No. 707,808 filed Feb. 23, 1968, now abandoned.

This invention relates to production of flexible porous membranes, especially flexible porous separators for use in a battery, particularly a high energy density battery, coated or impregnated with a composition consisting chiefly of inorganic material, and which is resistant to chemicals such as alkaline solutions, has good strength, low resistivity, and which will withstand operation in a battery at elevated temperatures of the order of 100°C. and above, and is particularly concerned with the provision of a battery separator construction in the form of an essentially enclosed housing of box-like configuration, formed of a flexible porous separator of the type noted above, the coated or impregnated material noted above being applied preferably by a simple dip-coating and curing operation.

The invention is also concerned with procedure for producing such flexible membrane or separator constructions and to batteries incorporating same.

Batteries are an important source of energy storage for power generation. In addition to the common lead-acid storage battery, an important type of battery is the high energy density alkaline electrolyte battery using such electrode combinations as silver-zinc, silver-cadmium and nickel-cadmium. High energy density batteries are generally battery systems which have a substantially higher energy per unit of weight than conventional, e.g., lead-acid, storage batteries. Such high energy density batteries have many applications such as in portable tools and appliances, television, radio and record players, engine starting, portable X-ray units, and the like. In such batteries, it is conventional to employ a separator in the form of a porous member between the electrodes.

In high energy density batteries such as silver-zinc, nickel-cadmium and silver-cadmium, the separator performs the function of retaining electrolyte, e.g., potassium hydroxide, separating the electrodes, and permitting transfer of electrolyte ions but preventing migration of electrode ions or growth of dendritic crystals of electrode ions which short circuit the battery.

Improved inorganic separators in the form of certain aluminosilicates which are particularly suited for use in high energy density batteries are described, for example, in the copending application of Carl Berger and Frank C. Arrance, Ser. No. 499,294, filed Oct. 21, 1965, now Pat. No. 3,379,570. Such inorganic separators, preferably in the form of sintered ceramic separators, when assembled in a battery of this type, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperature, e.g., of the order of 100°C. and above.

However, these rigid sintered separators present certain manufacturing, design and assembly problems. Thus, the production of the above-noted rigid inorganic separators, which are in the form of very thin membranes, requires a certain care in handling, packing and assembling in a battery to prevent cracking and breaking thereof. It has, therefore, assumed considerable importance to provide an inorganic separator which is readily produced and having the advantageous properties of the inorganic separators noted above, that is, having low resistivity, resistance to corrosive chemicals and operability at elevated temperatures, e.g., about 100°C., but which, in addition, is flexible and thus avoids the disadvantages of the rigid inorganic separators.

Further, the above inorganic separators or membranes are substantially rigid, and when employed in a battery between adjacent electrodes, e.g., zinc and silver electrodes, during operation of the battery, the electrodes, particularly the zinc electrode, tends to change shape and to move out of complete contact with the separator, thus reducing the electrical efficiency of the battery. Also, when employing the above-noted substantially rigid inorganic separators, it is necessary, when assembling such separators in a battery, together with the necessary electrodes or electrode plates, to mount the individual separators in properly spaced relation to provide electrode compartments between adjacent separators, and to then insert the electrodes in the electrode compartments between an adjacent pair of separators. This not only requires proper spacing of the separators so as to receive the electrodes therebetween in relatively snug fitting relation, but also requires that the electrode compartments on opposite sides of a separator be properly insulated to prevent short-circuiting of electrolyte from one electrode compartment around a separator and into the adjacent electrode compartment. Accordingly, a further particular area of interest has been the need for provision of electrodes having a flexible separator film or coating contained thereon, which is readily applied to the electrode, and which operates efficiently as a separator and avoids the disadvantges of separate rigid separators noted above.

In the copending application of Frank C. Arrance, et al., Ser. No. 378,898, filed June 29, 1964, now U.S. Pat. No. 3,364,077, there is described a separator formed by mixing an inorganic material such as potassium titanate with an organic bonding agent such as Teflon, employed in substantial or major amount, e.g., equal proportions of these components, and compressing and heating the mixture at elevated temperatures. However, these also are rigid separators.

In the copending application of Frank C. Arrance, Ser. No. 676,223, filed Oct. 18, 1967, now Pat. No. 3,542,596, there is described production of a flexible separator, which can be attached directly to an electrode, and which flexible separator is formed by applying to a rigid substrate such as a glass plate or to an electrode itself, e.g., by coating, a mixture of a major portion of an inorganic or ceramic separator material, a minor portion of potassium titanate in short fiber form, and a minor portion of an organic polymer, e.g., polyphenylene oxide, dissolved in a suitable solvent such as chloroform.

Although the flexible porous separator of the above copending application Ser. No. 676,223 has proved highly useful and satisfactory, and has solved many of the above-noted problems inherent in the use of rigid battery separators, it has been found to have certain shortcomings. Thus, in the dip-coating procedure for producing a porous separator according to the latter copending application, in order to produce a porous separator for use in a battery producing maximum voltage, it is important to make the flexible porous separator as thin as possible. But under these conditions such a thin, flexible separator often is vulnerable to puncture by any sharp or protruding portions of the metal electrode placed in contact therewith. Hence, to avoid this disadvantage, the porous separator must be made thicker, thus reducing the maximum voltage obtainable from the battery.

Further, employing the relatively thin, flexible separators of the above copending application Ser. No. 676,223, when gas is generated in the battery, it tends to form a rupture or blister in the porous separator membrane, resulting in reduced life of the separator.

Further, particularly where relatively thin, porous flexible separator membranes are formed, according to the invention of the last-mentioned copending application, since the thin separator film has no reinforcing means, even though the cured, porous flexible membrane produced according to this application is per se relatively strong, the durability and ruggedness of such porous flexible separators are not as great as desired in many battery applications.

Also, when a flexible porous separator film is applied to a surface of an electrode, as described in my latter above copending application, e.g., by dip-coating the electrode into the inorganic mixture used to form the porous separator, the resulting separator film is tightly adherent to the electrode so that, during operation of a battery containing such an electrode-separator unit, e.g., a zinc electrode coated with such flexible porous separator, a change in shape of the electrode, which often occurs particularly with respect to the zinc electrode, tends to cause cracking or other damage to the porous flexible separator film, resulting in premature shorting and reduced battery life.

Substantially the same problems noted above are encountered in connection with the separator-electrode unit of the copending application Ser. No. 676,224 of C. Berger and F. C. Arrance, filed Oct. 18, 1967, now abandoned, which discloses dip-coating an electrode into a mixture of an inorganic material such as aluminosilicate and a minor portion of a water coagulable organic fluorocarbon polymer such as vinylidene fluoride polymer, coagulating the film, and forming a flexible porous membrane or separator adhereing to the electrode.

It has now been found, according to the present invention, that an improved flexible porous separator preferably employing a composition essentially similar to that of the above copending application Ser. no. 676,223 can be prepared by applying, e.g., by coating, filling or impregnating, a suitable flexible porous substrate or carrier material, with a mixture of separator materials essentially of the type described in the last-mentioned copending application, but avoiding the disadvantages noted above with respect to the flexible porous separator of the latter application.

Accordingly, in preferred practice, the present invention provides a process for producing a flexible porous battery separator which comprises applying on a flexible porous substrate a film consisting essentially of a mixture of a major portion of a porous particulate inorganic material, a minor portion of potassium titanate, said potassium titanate being in the form of short fibers, and a minor portion of a curable organic polymer capable of bonding the particles of said inorganic material and said potassium titanite fibers together upon curing and forming a porous structure, said polymer being dissolved in a suitable solvent, removing the solvent, curing said polymer, and forming a flexible porous separator.

It has been found, according to the invention, that the resulting porous flexible separator, which is reinforced by a suitable flexible porous carrier, is not only rendered stronger and more durable than the flexible porous separator produced by the separator materials noted above and in the absence of such carrier, according to the above copending application Ser. No. 676,223, but the presence of the flexible carrier unexpectedly does not adversely affect the electrical characteristics of a battery containing such separator. Thus, the strengthened flexible porous separator of the present invention has good porosity characteristics to permit it to function efficiently for retaining electrolyte but preventing passage of electrode ions, has high resistance to alkali, and can be employed in batteries operating both at ambient and at elevated temperatures of the order of 100°C to about 150°C. and higher.

The flexible carrier containing the essentially inorganic separator materials, embodied in the improved flexible separator of the invention, is sufficiently durable and rugged so that, after preparation of the porous flexible separator film or sheet according to the invention, such sheet can be applied to conventional battery electrodes, such as zinc or silver electrodes, by wrapping the flexible film around one or both electrodes, or by forming the flexible porous separator into a compartment or box-shaped configuration, into which such electrode or electrodes can be inserted.

In preferred practice, a suitable flexible porous carrier or substrate, such as potassium titanate paper or nylon, is first fabricated into a box or bag of desired dimensions for receiving an electrode, by folding, wrapping, heat-sealing or cementing the substrate material to form the desired configuration. The resulting box or bag is then dip-coated in a slurry of a mixture of the above-noted inorganic separator materials, e.g., a mixture of Olivine (a solid solution of magnesium silicate and iron silicate), potassium titanate fiber, and polyphenylene oxide, followed by air-drying and heating the resulting coated or impregnated flexible carrier or matrix, to remove solvent and cure the organic polymeric bonding material. The resulting flexible box-shaped separator compartment can then receive an electrode, e.g., a zinc or silver electrode.

In preferred practice, for reasons noted below, a conventional electrode such as a zinc electrode is first inserted into an envelope formed of a flexible porous carrier of the type noted above, and the resulting unit is dipped into a slurry or mixture of the above separator material, and the unit is then removed and processed as noted above, to impregnate and coat the flexible porous carrier with the separator material.

The resulting flexible porous separator, in the form of an electrode compartment containing an electrode, when employed in a battery, e.g., a silver-zinc battery, utilizing potassium hydroxide as electrolyte, is essentially unaffected by the alkali when immersed for a substantial period therein and operates successfully over a larger number of charge-discharge cycles.

When a flexible porous separator, e.g., in the form of an electrode compartment receiving an electrode, is employed, the porous flexible carrier or matrix forming the flexible separator housing provides an electrolyte reservoir which controls the flow of electrolyte in and out of the adjacent electrodes during charging and discharging of the battery. The flexible matrix, coated or impregnated with the above-noted inorganic separator materials, has substantially greater flexibility and durability than the flexible inorganic separator film produced according to the above copending application Ser. No. 676,223, in the absence of a flexible matrix or carrier for the separator materials.

Further, when employing the porous flexible separator or separator compartment of the present invention in a battery, when gas is generated therein, whereas such gas would normally tend to develop a rupture or blister in the case of the flexible separator of the last-mentioned copending application, which is attached to the electrode, with the flexible separator or compartment of the present invention, the flexible separator matrix is sufficiently porous to permit passage of the gas; and, since the separator is not securely adhered to the electrode, as in the case of a dip-coated separator formed on the electrode of the latter application, the gas is permitted to pass upwardly between the separator forming the electrode compartment and the electrode, to the top of the battery assembly.

Further, since as previously noted, the box or bag-shaped, flexible porous separator forming the electrode compartment of the present invention has substantial flexibility, where the electrode which is inserted into such separator compartment has irregularities or bumps, and the separator-electrode unit is incorporated in a battery and compressed therein, these irregularities in the electrode are accommodated as a result of the flexible nature of the separator matrix, and such irregularities in the electrode do not result in puncturing or damaging the separator housing.

The invention will be more clearly understood from the further description below of certain embodiments of the invention, taken in connection with the accompanying drawing, wherein:

FIG. 1 is a representation of a box-shaped, flexible porous carrier or matrix for production of a porous separator in the form of an electrode compartment, according to the invention;

FIG. 2 illustrates a preferred mode of procedure for coating or impregnating the porous flexible box-shaped carrier or matrix of FIG. 1 for producing the porous separator of the invention;

FIG. 3 shows incorporation of an electrode into the box-shaped porous flexible separator produced by the invention procedure;

FIG. 4 shows a flexible porous separator in the form of an electrode compartment according to the invention, containing an electrode, and assembled in a single-cell battery together with a conventional electrode;

FIG. 5 illustrates an assembly of a plurality of the electrode-flexible separator units of FIG. 3 to form a multiplate battery; and FIG. 6 illustrates wrapping of a flexible porous separator in the form of a flexible film or sheet, according to the invention, around a plurality of conventional electrodes to provide a multiplate battery assembly.

According to a preferred embodiment, a prefabricated envelope of box-shaped configuration, indicated at 10 in FIG. 1, is provided. The envelope 10 is in the form of a porous flexible carrier or matrix material of a type described more fully below, and is enclosed on all four sides, with a bottom portion 12 and an open upper end 14, for receiving an electrode therein as described more fully below. The envelope or bag, in the form of the box-shaped compartment 10, can be fabricated by folding, wrapping, heat-sealing or cementing the porous flexible carrier material to form the desired configuration to receive an electrode. Any flexible material, either organic or inorganic, preferably the latter, of sufficient strength and porosity and having high resistance to alkali, e.g., potassium hydroxide, and to oxidation, and which provides an electrode compartment with high structural integrity, can be employed. Thus, for example, flexible sheets or matts of inorganic material such as potassium titanate paper, asbestos, aluminosilicate sheets or matts, can be employed, and also suitable organic sheets or matts such as nylon, polytetrafluoroethylene (Teflon), polyphenylene oxide, polysulfone, polyethylene, polypropylene, copolymers of vinyl chloride and acrylonitrile, and the like, in the form of sheets, matts or paper, can be employed.

The above-listed flexible porous matrix materials are understood to be exemplary only, and other materials having suitable characteristics noted above can also be utilized.

The porous flexible envelope 10 is then dipped or immersed in a slurry of inorganic separator material, illustrated at 16 in FIG. 2 of the drawing. The slurry preferably is formed of a solvent containing inorganic or ceramic separator material of any suitable type, such as those described hereinafter, and chopped potassium titanate fibers, preferably of a size less than about 0.008 inch in length, mixed together in major and minor proportions respectively, to form a highly uniform mixture of the inorganic separator material and potassium titanate fibers, essentially free of agglomerates, with an organic polymeric material incorporated with the inorganic or ceramic powders and having the property of bonding the individual particles of the inorganic material and the potassium titanate fibers together upon curing of the organic polymer, to result in a porous structure effective when used as a battery separator.

Such solvent slurry of inorganic or ceramic separator material, potassium titanate fibers and polymeric bonding agent is described in detail in the above copending application Ser. No. 676,223, and the disclosure of such application is incorporated herein by reference.

The inorganic separator material present as an essential component of the coating or impregnating slurry 16 in FIG. 2, and used to form the flexible separators of the invention, can include a variety of porous inorganic or ceramic substances in powder or particulate form. Thus, for example, suitable inorganic separator materials include insoluble metal oxides and insoluble hydrous metal oxides, such as the oxides and hydrous oxides of zirconium, titanium, antimony, tungsten, silicon, scandium, bismuth, vanadium, aluminum and cerium in particulate form. Such hydrous metal oxide separator materials and their method of preparation are described in the copending application Ser. No. 379,093 filed June 30, 1964, now U.S. Pat. No. 3,489,610 of Carl Berger, et al. A preferred separator of this type is hydrous zirconium oxide or zirconia.

Other porous inorganic materials which can be employed for producing the separator according to the invention include particulate sintered aluminosilicates, especially the alkali metal and alkaline earth metal aluminosilicates and alumina, because of their formation of a hard ceramic material upon sintering, while still retaining suitable porous characteristics. The aluminosilicates of suitable porous internal structure are particularly preferred in this respect. Examples include non-fluxed aluminosilicate, fluxed aluminosilicates or salts thereof, such as sodium and potassium aluminosilicates, and magnesium, calcium, barium and strontium aluminosilicates, e.g., magnesium aluminosilicate (Cordierite). These materials can be used separately, but often mixtures of these particulate aluminosilicates are used, e.g., complex mixtures of both the alkali metal and alkaline earth metal aluminosilicates. Such aluminosilicate separator materials are described in the above copending U.S. application Ser. No. 499,294, filed Oct. 21, 1965, now U.S. Pat. No. 3,379,570.

Another useful class of inorganic separator materials are the naturally occurring clay minerals of the kaolinite group. This is a group of naturally occurring clays containing aluminum oxide and silica, usually together with bound water, and having the formula $Al_2O_3 \cdot 2SiO_2 \cdot H_2O$. In addition to kaolinite, other useful members of this group include the mineral clays halloysite, dickite, nacrite and anauxite.

Other types of inorganic separator materials which can be employed include those in the form of a particulate sintered porous solid solution of magnesium silicate and a member selected from the group consisting of zinc silicate and iron silicate as described and claimed in the copending application Ser. No. 539,554, filed Apr. 1, 1966, now U.S. Pat. No. 3,446,668, of Frank C. Arrance et al., and which includes the naturally occurring magnesium-iron silicate solid solution known as the mineral Olivine, and the inorganic separator materials in the form of a particulate sintered porous solid solution of an aluminum-bearing material such as aluminum oxide, and a substance selected from the group consisting of chromium, cobalt, nickel, magnesium, calcium and iron-bearing materials, e.g., a mixture of alumina and chromic oxide, as described and claimed in copending application Ser. No. 555,891, filed June 7, 1966, now U.S. Pat. No. 3,446,669, of Frank C. Arrance, et al.

The disclosures of the above copending applications are incorporated herein by reference.

Additional inorganic materials in particulate form which can be employed include silicates such as magnesium silicate (Fosterite), and the like.

It will be understood that mixtures of the above particulate materials can also be employed.

The organic polymeric materials incorporated with the inorganic or ceramic materials or powders noted above to produce the flexible membrane or separator of the invention are preferably chosen from those curable polymers which have the property of bonding the individual particles of inorganic materials and the potassium titanate fibers together upon curing of the organic polymer, but do not fill the voids between the ceramic material and potassium titanate particles, so as to result in a porous structure effective when used as a battery separator. A preferred polymeric material which has been found particularly advantageous is polyphenylene oxide (marketed as PPO by General Electric). Polysulfone can also be employed but results in a less porous separator of higher resistivity than when employing polyphenylene oxide. Also, polyamides such as nylon, neoprene rubber, polyepoxides, such as the polymer of bisphenol A and epichlorohydrin (the Epons), and fluorocarbon polymers such as vinylidene fluoride polymers (Kynar), and the copolymer of hexafluoropropylene and vinylidene fluoride (Viton) may be employed. In addition to having the properties of bonding the particles of inorganic material and potassium titanate together so as to form a flexible, strong, thin membrane having suitable porosity for use as a battery separator, such polymers should be resistant to attack by chemicals such as alkaline solutions, e.g., potassium hydroxide solution, employed in high energy density batteries, both at ambient and at elevated temperatures.

The above-noted polymeric materials are employed in particulate or granular form, and mixtures of such polymeric materials also can be employed.

The potassium titanate, although in fiber form, is used as very short fibers not longer than 0.008 inch, to avoid clumping and agglomeration of the mixture. It is also preferred that the inorganic or ceramic powder be ground to a particle size such that 95% of the particles of such inorganic material are of less than 10 micron particle size.

The relative proportions of inorganic or ceramic material, potassium titanate particles and organic polymeric binder employed for producing the flexible membranes of the invention can vary. The amount of ceramic powder and potassium titanate together preferably should be at least 50%, and preferably substantially greater than 50%, of the mixture, and the amount of either the ceramic material or the potassium titanate employed can be less than or in excess of 50% of the mixture; ordinarily, the inorganic or ceramic material is present in major proportion and the potassium titanate in minor proportion. The amount of polymeric material can vary widely and can constitute as much as 50% or more of the mixture, but under these conditions the result is a separator of increased internal resistance, although having greater flexibility. Hence, in preferred practice, the organic polymeric material is employed in minor proportions to obtain sufficient bonding and porosity, yet to afford substantial flexibility. Thus, for example, generally there can be employed from about 60% to about 95% of inorganic or ceramic powder, about 2% to about 35% potassium titanate fibers, and about 2% to about 35%, by weight, of organic polymeric material. The proportion of polymeric material employed in combination with the mixture of ceramic material and potassium titanate is chosen to provide a membrane or separator of good flexibility and film strength, yet which has low resistivity and other characteristics permitting the membrane to function efficiently as a battery separator, especially in high energy density alkaline batteries.

The organic polymer is dissolved in a volatile solvent which dissolves the polymer and which has good volatility to permit quick removal from the coated film. Any suitable solvent having these characteristics can be employed. The particular solvent chosen depends in large measure on the particular polymer employed. Thus, for example, chloroform, trichloroethylene, toluene, mixtures of chloroform and carbon tetrachloride, and mixtures of chloroform and trichloroethylene have been found suitable for use with polyphenylene oxide polymer. Dimethyl acetamide has been found suitable for use with polysulfone and fluorocarbon polymers, and toluene has been found suitable for employment with neoprene rubber and epoxy material. The amount of solvent employed can vary, but generally the amount employed is such that the organic or polymeric solids content ranges from about 20 to about 70 parts per 100 parts by weight of solvent, the amount of solvent used being such that it is readily evaporated in a conveniently short time after film formation.

The slurry of inorganic or ceramic powder, e.g., aluminosilicate, potassium titanate particles, and the organic polymer, e.g., polyphenylene oxide, dissolved in the solvent, is preferably maintained in vibration during dipping of the porous flexible envelope 10 in the slurry 16. This is preferably carried out by applying a suitable mechanical vibration source, e.g., an AC solenoid, while at the same time the dipping mixture is subjected to a stirring action to sweep away bubbles which form during this coating procedure. The vibration of the dipping mixture results in obtaining a uniform coating or impregnation of the mixture on or into the porous envelope 10. The vibration of the dipping mixture is adjusted in relation to the rate of withdrawal of the envelope 10 so as to obtain a thin uniform coating or uniform impregnation without running or "tearing."

After the porous envelope 10 containing the separator coating or impregnated with the separator materials is removed from the mixture, it is subjected to air drying for solvent removal. The coating is then cured at temperatures which can range from about 100° to about 550°F., with the time of curing depending upon the particular polymer employed, the size of the particular surface area being covered, and other factors, including the temperature of cure. Curing time can range, for example, from about 10 to about 30 mintues, at the above elevated temperatures. Although air drying of the coated or impregnated film for an extended period of time, e.g., of the order of about 24 hours or more, can eliminate curing at elevated temperatures, this is not preferred practice.

The resulting substantially inorganic separator film formed on or impregnated into the porous flexible envelope or matrix 10, following curing, is highly flexible, as described in the above copending application Ser. No. 676,223. Hence, the porous flexible matrix 10, following impregnation or coating of the flexible, substantially inorganic separator film thereon, has substantially the same flexibility as the initial envelope or matrix 10 prior to treatment in the slurry 16. Thus, the resulting electrode compartment or envelope 10', following impregnation or coating with the substantially inorganic separator material, can be flexed and bent without cracking of the separator film; and such film does not crack or disintegrate when an electrode is inserted into the envelope, as noted below.

As previously noted, during treatment of the porous flexible matrix or envelope 10 in the slurry of separator material 16, the separator material can be impregnated into or coated upon the surface of the envelope, or both, depending upon the structural characteristics of the particular porous flexible material of which the envelope is fabricated. Thus, for example, when employing a highly porous, flexible material, such as Pellon (nylon) as the matrix, a substantial amount of the organically bonded inorganic separator material is impregnated into the pores of the material, and the surface of the material will also be coated with a thickness of the bonded, inorganic separator material, depending upon the extent of treatment of the envelope in the slurry of separator material. Thus, for example, a Pellon envelope 10 having a thickness of about 0.006 inch can have a total coating thickness on each side of between 0.001 inch and 0.003 inch. On the other hand, less porous flexible materials used for the envelope 10, such as asbestos sheet, will have less bonded inorganic separator material impregnated therein for a given thickness, but generally will have a thicker coating of the inorganic separator material formed thereon for a given period of treatment. Thus, for example, such asbestos sheet can have a coating thickness on each side of between about 0.003 inch and about 0.006 inch. Total overall coating thickness on the various flexible porous matrix materials which can be employed can vary from about 0.001 inch to about 0.025 inch.

The thickness of the initial flexible matrix materials employed can range from about 0.003 inch to about 0.050 inch.

The porosity of the flexible separators of the invention, e.g., in the form of a flexible porous envelope or matrix, following impregnation or coating thereon with the separator material, can range from about 5% to about 35%, but such range is understood to be only exemplary.

Pore sizes or diameters of the final flexible porous material coated or impregnated with the flexible separator material generally can range from about 1 to about 200, preferably about 5 to about 200, Angstrom units, but can be outside this range.

As previously noted, the porous flexible bag or electrode compartment 10', following impregnation or coating with the bonded inorganic separator material, is highly flexible and can be bent in any direction, but is of considerable strength and is resistant to tearing and can be handled readily without damage. This permits the insertion of an electrode 18, as illustrated in FIG. 3, and preferably containing a collector grid indicated at 19, into the envelope or box-shaped electrode compartment 10', without damage to the bonded inorganic separator film, as a result of expansion of the sides of the envelope during the process of incorporating the electrode.

Although only that portion of the envelope 10' which is contacted by the electrode 18 need be treated with the essentially inorganic separator material in slurry 16, it is preferred to impregnate or coat the entire surface area of the envelope 10 with such separator material.

Instead of impregnating and coating the flexible porous envelope 10 first, followed by inserting an electrode therein, as illustrated in FIG. 3, in preferred practice an electrode, e.g., a zinc electrode, is first inserted into the flexible envelope, and the envelope containing the electrode is then preferably dipped into a slurry or mixture 16 of the separator materials described above, followed by curing of the thus coated and impregnated flexible envelope, to provide a separator film on the flexible carrier with the electrode contained therein. This modification has the advantages of greater uniformity of performance in a battery, provides a tighter fit for the electrode, and avoids any possible damage to the separator film on the carrier, where the electrode is inserted into the carrier following impregnation and coating of the separator film on the carrier.

Any type of electrodes can be inserted into and insulated by a flexible separator compartment 10 or 10', according to the invention. These include the lead electrodes employed in conventional lead-acid batteries, and particularly electrodes employed in high energy density batteries such as silver, zinc, cadmium and nickel electrodes. The invention provides a high rate battery separator, particularly suitable for use in high energy density batteries such as silver-zinc, silver-cadmium and nickel-cadmium batteries, using aqueous electrolytes, and for other battery systems such as those emloying non-aqueous electrolytes such as propylene carbonate, butyrolactone, with such electrode couples as lithium-cupric chloride and magnesium-silver chloride.

During discharge of batteries such as those described and illustrated above, as is well known, e.g., in the case of a silver-zinc battery, the zinc converts to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium," and the term "lead" referring to the metals forming the respective electrodes of silver-zinc, silver-cadmium, nickel-cadmium and lead-acid battery systems, are intended to denote either the respective metals themselves or the corresponding oxides thereof.

The zinc electrode-separator unit, as indicated at 20 in FIG. 3 of the drawing, including the flexible separator bag 10' containing the zinc electrode 18, can be incorporated in a battery 22 as illustrated in FIG. 4, together with a conventional silver electrode 24, the unit 20 being disposed substantially in contact with the silver electrode 24, with an adjacent portion of the flexible film of the separator envelope 10' being in contact with the adjacent surface of the silver electrode. If desired, although not necessary, a material such as teflon felt, indicated at 25, can be placed over the top of the zinc electrode 18 within the flexible separator envelope 10', to aid in retaining the electrolyte in the zinc electrode compartment. The collector grid 19 of the zinc electrode is connected by a lead 26 to an external terminal 28, and the collector grid 30 of the silver electrode is connected by means of a lead 32 to a terminal 34.

There is illustrated in FIG. 5 the incorporation of the electrode-separator unit produced according to the invention and illustrated at 20 in FIG. 3, in the form of a flexible separator envelope 10' containing zinc electrode 18, in a multiplate battery 36. In this arrangement, it is seen that three zinc-separator units 20 including zinc electrodes 18, according to the invention, are alternately disposed in relation to four silver electrodes 24, with the flexible film 10' of the respective envelope or electrode compartment units 20 separating adjacent zinc and silver electrodes 18 and 24, respectively. The leads 26 from the zinc electrodes 18 are collectively connected to the terminal 28, and the leads 32 from the silver electrodes 24 are collectively connected to the terminal 34. It is seen that the separator-electrode units 20, with the flexible envelope 10', permit simple placement of these units in the battery with the respective silver electrodes 24 disposed alternately therebetween, and insulating the respective silver and zinc electrode compartments, without the necessity for separate individual separators being incorporated in the battery with means for supporting such separators so as to insulate the electrode compartments.

Instead of employing an envelope or box-shaped flexible electrode compartment, as illustrated at 10 and 10' in the drawing, the separator of the invention can be prepared commencing with a flexible film or matrix in the form of any of the porous flexible matrix or carrier materials noted above, and after processing as described above, e.g., by impregnating or coating the flexible matrix with a slurry of a substantially inorganic material, as indicated at 16 in the drawing and described above, the resulting coated or impregnated flexible separator can then be formed into the desired shape, e.g., a box-like configuration such as illustrated at 10 and 10', for receiving an electrode.

Alternatively, a flexible porous matrix or sheet, coated or impregnated with the separator material according to the invention, can be wrapped around one or a plurality of electrodes to provide a battery assembly.

Thus, in FIG. 6 there is illustrated a multiplate battery indicated at 40 formed of a plurality of three zinc electrodes 18 and four silver electrodes 24, alternately arranged in a battery pack. A porous flexible separator film or sheet, indicated at 42, formed according to the invention by impregnating or coating a porous flexible carrier with a slurry of an essentially inorganic separator material containing a polymeric bonding agent as described above, is wrapped in serpentine fashion around each of the zinc and silver electrodes 18 and 24, respectively, to provide a separator film between each adjacent pair of zinc and silver electrodes.

It will be understood that, in the embodiment of FIGS. 4 and 5, the conventional silver electrodes 24 can also be in the form of an electrode-separator unit, as illustrated in FIG. 3, according to the invention, in the form of a flexible porous separator envelope containing the electrode and produced, e.g., by dip-coating a flexible porous matrix or envelope 10, by procedure as described above. In such modifications, both the silver and zinc electrodes of FIGS. 4 and 5 are then covered and insulated by a flexible, essentially inorganic separator according to the invention.

The following are examples of practice of the invention:

EXAMPLE 1

A zirconium oxide powder is ground to a particle size such that 95% of the powder is composed of particles of less than 10 microns size.

Potassium titanate fibers are chopped up into very short lengths, sufficiently short so that the chopped fibers pass through a 0.008 inch screen.

A mixture of about 18 parts of zirconium oxide powder and about 1 part of the chopped potassium titanate fibers, by weight, is passed through a mill, the entire mixture being passed through a 0.008 inch screen several times. This results in a highly uniform, non-fluffy mixture of the ceramic powder and the short potassium titanate fibers in non-agglomerated form.

The resulting mixture of ceramic powder and potassium titanate fibers is then combined with one part by weight of polyphenylene oxide dissolved in chloroform, thus forming a slurry consisting of about 90% of the zirconium oxide powder, about 5% of potassium titanate particles, and about 5% polyphenylene oxide, by weight.

A flexible porous pure asbestos envelope of box-shaped configuration, as illustrated in FIG. 1 of the drawing, is dipped into the above slurry while maintaining the slurry under vibration by means of an A.C. solenoid, and stirred, to facilitate uniform saturation and coating of the flexible asbestos envelope and escape of air. After dipping, the asbestos coated and impregnated envelope is air-dried for 15 minutes to remove solvent, and is then oven-cured for 15 minutes at 350°F.

The resulting impregnated and coated asbestos envelope is highly flexible, has a porosity of about 15%, and a pore size ranging from about 5 to about 200 Angstroms, has good strength and can be handled readily without tearing. The thickness of the initial pure asbestos envelope is 0.010 inch, and the overall thickness of the coated and impregnated envelope is about 0.012 inch.

The resulting impregnated and coated flexible asbestos envelope forms an electrode compartment, and a standard zinc electrode is inserted therein to form a flexible separator-electrode unit, as indicated at FIG. 3 in the drawing.

The resulting separator-zinc electrode unit is incorporated in a battery of the type illustrated in FIG. 4 of the drawing, except employing two conventional silver electrodes with the separator-zinc electrode assembly described above and illustrated in FIG. 3 disposed between the two silver electrodes. A 30% potassium hydroxide solution is employed as electrolyte in the battery.

The battery is charged and placed on a test stand and allowed to stand for 5 months. For the period of 5 months on the test stand, the battery maintains its normal 1.86 O.C.V. (open circuit voltage). At the end of the 5-month period the cell is discharged and still has its original capacity of about 1.5 A.H. (ampere hours). This indicates complete integrity of the asbestos separator envelope during the above-noted 5-month period, and lack of any shorting of the battery as result of any disintegration of such separator envelope.

EXAMPLE 2

A unit in the form of a flexible pure asbestos (fuel cell asbestos) envelope, as illustrated at 10 in FIG. 1, and having a standard zinc electrode inserted therein, is dipped into a slurry and processed as described in Example 1 above, except that in place of the zirconium oxide inorganic material employed in such slurry there is employed a sintered powder in the form of a solid solution of magnesium silicate and iron silicate, of the type described in U.S. application Ser. No. 539,554, noted above, in the form of the mineral Olivine.

A multiplate battery is assembled of the type illustrated in FIG. 5 of the drawing, employing four of the above separator-zinc electrode units each comprising a coated and impregnated flexible asbestos envelope, containing the zinc electrode as illustrated in FIG. 3, with five conventional silver electrodes in alternate relation, so that each asbestos separator-zinc electrode unit is adjacent a pair of silver electrodes. A 30% potassium hydroxide solution is placed in the battery.

The above 5 A.H. capacity battery is subjected to total discharge tests, the battery being totally discharged for 2 hours at C/2 (one-half capacity) and then discharged for more than 50 charge-discharge cycles. After 50 such cycles the battery is observed to maintain its O.C.V. of 1.86 volts, and has its same 5 A.H. capacity, indicating that the flexible asbestos separator envelope remained intact without any shorting over the above test period.

EXAMPLE 3

A zinc electrode is inserted into a flexible nylon felt (Pellon P-6) envelope of a thickness of 0.006 inch, in the form of a box-shaped electrode compartment, which tightly receives the zinc electrode. The envelope containing the zinc electrode is coated and impregnated by the procedure as described in Example 1, employing the Olivine-containing slurry described in Example 2 above.

The resulting coated and impregnated Pellon envelope has a porosity of about 15% and a pore size ranging from about 5 to about 200 Angstroms, the total coated thickness of the Pellon envelope being about 0.011 inch.

A multiplate battery similar to that described in Example 2 above, employing four of the above separator-zinc electrode units each comprising an impregnated and coated separator envelope, together with five conventional silver electrodes, is tested in the same manner as in Example 2 above.

The resulting battery maintains its nominal O.C.V. of 1.86 volts for approximately 30 cycles.

EXAMPLE 4

A nylon felt (Pellon P-6) flexible envelope is coated and impregnated with an organic polymer bonded inorganic separator material by dipping in an Olivine-containing slurry of the type described in Example 2, employing procedure substantially the same as described in Example 1. The resulting coated and impregnated nylon flexible electrode compartment, of a total thickness of about 0.011 inch, and having inserted therein a conventional nickel electrode, is assembled in a simple battery of the type illustrated in FIG. 4 of the drawing, together with a conventional cadmium electrode. A 30% potassium hydroxide solution is added to the battery.

This battery is cycled for more than 1,200 charge-discharge cycles, with a total discharge in two hours followed by a total recharge for two hours to 140% recharge. The electrical performance of the battery at the end of this period of testing remains unchanged from that of the first cycle. Thus, the capacity of the battery remains 0.6 A.H., with a discharge voltage plateau of 1.18 volts.

Similar results are obtained when the cadmium electrode is disposed in the coated and impregnated flexible envelope instead of the nickel electrode, and also similar results are obtained when both the nickel and cadmium electrodes are each disposed in separate flexible porous separator envelopes.

EXAMPLE 5

A silver-zinc battery is prepared as described in Example 1 above and tested at 100°C. The battery is subjected to 25 cycles, including 25 total discharges followed by recharging after each discharge. The battery after this period of testing maintains its original capacity of about 1.5 A.H., indicating complete effectiveness of the nylon separator during this period of testing.

EXAMPLE 6

An asbestos, flexible envelope or electrode compartment having a conventional zinc electrode inserted therein, is coated and impregnated with a slurry of the type described in Example 2 above.

Such flexible separator-zinc electrode unit is assembled in a simple battery of the type illustrated in FIG. 4 of the drawing, together with a conventional silver electrode, using 45% potassium hydroxide electrolyte. Such battery has a high discharge voltage of 1.43 at 2/C (twice the initial capacity of the cell) and remains effective after a large number of discharge-charge cycles.

After thermal sterilization of the battery for 128 hours at 135°C in contact with the 45% potassium hydroxide electrolyte, the battery continues to operate effectively.

EXAMPLE 7

The procedure of Example 1 above is followed substantially, except for employing, in place of polyphenylene oxide, the same amount of polysulfone, and employing dimethyl acetamide solvent in the treating slurry.

Results similar to those of Example 1 are obtained, except for a somewhat higher resistivity of the resulting separator film.

EXAMPLE 8

A strip of potassium titanate paper 0.020 inch thick is dipped in an Olivine-containing slurry as described in Example 2 above, and the procedure of Example 1 is followed, forming a flexible coated and impregnated porous separator. The resulting separator is flexible, durable and remains unaffected by immersion in 31% KOH for up to 48 hours.

The above tests are repeated employing filter paper instead of potassium titanate paper. Results similar to those for potassium titanate paper are obtained.

EXAMPLE 9

A standard zinc electrode is dipped in the Olivine-containing suspension of Example 2 above, and the coating dried and cured by procedure similar to that described in Example 1 above to form a separator coating on the zinc electrode.

A flexible nylon felt (Pellon P-6) envelope is coated and impregnated with Olivine separator material, and a standard zinc electrode inserted into the envelope or sack as described in Example 3 above.

The above zinc electrode having the separator coating secured thereto, and the above Pellon envelope separator-zinc electrode unit are each incorporated in a simple battery with a standard silver electrode, as illustrated in FIG. 4.

The battery containing the flexible Pellon envelope-zinc electrode unit according to the invention, operates effectively for more than double the total number of charge-discharge cycles as compared to the battery containing the zinc electrode coated with the Olivine-containing slurry, the latter coating failing due to separator coating rupture, resulting in shorting of the battery.

EXAMPLE 10

A flexible pure asbestos sheet is dipped into a slurry of the type described in Example 2 and treated by the procedure described in Example 1, to form a flexible, coated and impregnated separator sheet having substantially the same properties as the coated and impregnated separator envelope of Example 2.

Such separator sheet is wound around four zinc negative electrodes and five silver electrodes in a battery arrangement of the type shown in FIG. 6.

The battery, when tested, shows results similar to those obtained in Example 2.

Although the invention has been described chiefly in connection with treatment, as by dipping, of a porous flexible matrix, into a slurry or mixture of separator material of the type described in the above copending Ser. No. 676,223, other types of suitable substantially inorganic material containing an organic polymeric bonding agent can be employed for impregnating and coating the flexible porous matrix or carrier, e.g., in the form of an envelope for receiving an electrode, according to the invention. Thus, such porous flexible carrier or envelope can be impregnated and coated by employing the coating materials and procedure of the above copending application Ser. No. 676,224, e.g., by dipping the flexible carrier or envelope in a mixture of a porous inorganic material of the types described above, e.g., an aluminosilicate powder, and a minor portion of a water coagulable fluorocarbon polymer such a vinylidene fluoride polymer (Kynar), the copolymer of hexafluoropropylene and vinylidene fluoride (Viton), and the like, in a water miscible volatile solvent for the polymer, such as dimethyl formamide or acetamide, the solvent removed and the polymer coagulated by heating and treatment with water, to bond the particles of inorganic material and form the separator film. The disclosure of the above copending application Ser. No. 676,224 with respect to the above coating mixtures and procedure for forming a flexible separator film are incorporated herein by reference.

There is illustrated below an example employing a coating composition and the film forming technique described in the above latter application, for impregnating and coating a flexible porous carrier or matrix, according to the present invention.

EXAMPLE 11

A standard zinc electrode is inserted into a flexible asbestos envelope 0.007 inch thick, and the envelope containing the zinc electrode is dip-coated in a slurry or mixture consisting of 80 parts of a powdered solid solution of magnesium silicate and iron silicate (Olivine), 20 parts vinylidene fluoride polymer (Kynar), and 100 parts dimethyl formamide, by weight.

The resulting impregnated and coated flexible envelope containing the zinc electrode, is placed in a vacuum to remove solvent, is heated at 120°F for about 2 minutes, and then is placed in distilled water to coagulate the impregnated and coated separator film. The resulting impregnated and coated flexible asbestos envelope has a thickness of about 0.012 inch.

The resulting unit consisting of the impregnated and coated flexible asbestos envelope containing the tightly fitting zinc electrode shows favorable voltage performance when tested in comparison with a conventional zinc electrode in contact with a rigid inorganic separator membrane formed from a solid solution of magnesium silicate and iron silicate.

It will be understood that instead of dipping the flexible porous matrix or envelope into a slurry of the electrode material, the flexible sheet or envelope can be treated in any other manner, e.g., by spraying, brushing and the like, to impregnate and/or coat the slurry onto the flexible, porous matrix.

The term "box-shaped" porous envelope or electrode compartment employed in the specification and claims is intended to denote an envelope of any desired cross-section, e.g., square, rectangular, octagonal, circular or elliptical, which will enclose the sides of an electrode inserted therein.

From the foregoing, it is seen that the invention provides a durable porous separator composed chiefly of inorganic material, yet which is flexible, and which is particularly useful as a separator in batteries, especially high energy density batteries, and electrode-flexible separator units in which the flexible porous separator is in the form of a porous flexible envelope which is readily prepared, e.g., by dip coating of a porous flexible matrix in a slurry of essentially inorganic separator material, and which is effective for high rate battery applications. An additional advantage is that the porous flexible separator hereof is simple and inexpensive to fabricate and assemble with electrodes in a battery.

While we have described particular embodiments of the invention for purposes of illustration, it will be understood that various changes and modifications can be made therein within the spirit of the invention, and the invention accordingly is not to be taken as limited except by the scope of the appended claims.

We claim:

1. A flexible porous battery separator for a high energy density battery, which consists essentially of a flexible asbestos porous substrate coated with a film consisting essentially of a major portion of an inorganic separator material, a minor portion of potassium titanate fibers and a minor portion of a cured organic polymer selected from the group consisting of polyphenylene oxide and polysulfone, bonding the particles of said inorganic material and said potassium titanate fibers together to form a porous substantially inorganic separator film on and adhered to said substrate, the resulting porous substrate containing said coated separator film being flexible and resistant to alkali.

2. A flexible porous battery separator as defined in claim 1, wherein said organic polymer is polyphenylene oxide.

3. A flexible porous battery separator as defined in claim 1, wherein said flexible asbestos; porous substrate is in the form of sheets, mats or paper, and wherein said inorganic separator material is selected from the group consisting of insoluble metal oxides and insoluble hydrous metal oxides, alumino-silicates, a solid solution of magnesium silicate and a member selected from the group consisting of zinc silicate and iron silicate, and a solid solution of an aluminum-bearing material and a substance selected from the group consisting of chromium, cobalt, nickel, magnesium, calcium and iron-bearing materials, and magnesium silicate.

4. A flexible porous separator as defined in claim 1, wherein said inorganic separator material consists essentially of zirconium oxide.

5. A flexible porous separator as defined in claim 1, wherein said inorganic separator material consists essentially of a solid solution of magnesium silicate and a member selected from the group consisting of zinc silicate and iron silicate.

6. A flexible porous separator as defined in claim 1, wherein said flexible porous separator is box-shaped for receiving a battery electrode.

7. A flexible porous box-shaped separator as defined in claim 6, containing therein a battery electrode.

8. A battery comprising a pair of electrodes of opposite polarity and positioned between said electrodes for retaining electrolyte, a flexible porous separator as defined in claim 1.

9. A battery comprising a pair of electrodes of opposite polarity and positioned between said electrodes for retaining electrolyte, a flexible porous separator as defined in claim 2.

10. A battery comprising a pair of electrodes of opposite polarity and receiving at least one of said electrodes, a flexible porous separator as defined in claim 6, forming a box-shaped separator-electrode containing unit.

11. A flexible porous battery separator as defined in claim 1, said inorganic separator material being present in an amount of about 60 to about 95%, said potassium titanate fibers being present in an amount of about 2 to about 35%, and said organic polymer being present in an amount of about 2 to about 35%, by weight, said potassium titanate fibers being less than about 0.008 inch in length.

* * * * *